(12) United States Patent
Kern

(10) Patent No.: US 7,761,905 B2
(45) Date of Patent: Jul. 20, 2010

(54) METHOD AND SYSTEM FOR ASSIGNING ACCESS RIGHTS IN A COMPUTER SYSTEM

(75) Inventor: Ruediger Kern, Hofheim (DE)

(73) Assignee: International Business Machines Corporation, Armonk, NY (US)

( * ) Notice: Subject to any disclaimer, the term of this patent is extended or adjusted under 35 U.S.C. 154(b) by 987 days.

(21) Appl. No.: 11/236,127

(22) Filed: Sep. 27, 2005

(65) Prior Publication Data

US 2006/0136991 A1    Jun. 22, 2006

(30) Foreign Application Priority Data

Dec. 17, 2004   (EP)   .................................. 04106673

(51) Int. Cl.
*H04L 29/00*   (2006.01)
(52) U.S. Cl. ........................ 726/2; 726/1; 726/3; 726/4; 726/5; 726/6; 726/7; 726/8; 726/9; 726/10; 726/11; 726/12; 726/13; 726/14; 726/15; 726/16; 726/17; 726/18; 726/19; 726/20; 726/21; 707/9; 707/10; 380/25
(58) Field of Classification Search ........................ 726/1, 726/2–21; 707/9–10; 380/25
See application file for complete search history.

(56) References Cited

U.S. PATENT DOCUMENTS

| | | | |
|---|---|---|---|
| 5,315,657 A * | 5/1994 | Abadi et al. ................... 726/4 |
| 5,911,143 A | 6/1999 | Deinhart et al. ............. 707/103 |
| 6,023,765 A * | 2/2000 | Kuhn ............................. 726/4 |
| 6,295,607 B1 * | 9/2001 | Johnson ........................ 726/17 |
| 6,321,334 B1 * | 11/2001 | Jerger et al. ..................... 726/1 |
| 6,931,052 B2 * | 8/2005 | Fuller et al. .................. 375/144 |
| 7,089,243 B1 * | 8/2006 | Zhang ............................. 707/9 |
| 2005/0050048 A1 * | 3/2005 | Perez ........................... 707/10 |
| 2005/0138419 A1 * | 6/2005 | Gupta et al. ................ 713/201 |
| 2006/0090208 A1 * | 4/2006 | Smith ........................... 726/26 |

OTHER PUBLICATIONS

"The NIST Model for Rol-Based Access Control: Towards a Unified Standard", R. Sandju et al, Proceedings of the Fifth ACM workshop on Role-based access control table of contents, Berlin, Germany, 2000.

* cited by examiner

*Primary Examiner*—Nasser Moazzami
*Assistant Examiner*—Ghazal Shehni
(74) *Attorney, Agent, or Firm*—Schmeiser, Olsen & Watts; William H. Steinberg

(57) ABSTRACT

The invention relates to a system and a method for assigning access rights in a computer system. The system transforms an existing system of access rights to a more structured system. In many cases this is a prerequisite such that role-based administration can be used. The method identifies the existing system of access rights and identifies new roles by means of a correlation approach. New roles are created and all old roles are deleted. All direct access rights are avoided making an administration of the system easier and the computer system more secure.

23 Claims, 6 Drawing Sheets

| Subject \ Object | o1 | o2 | o3 | o4 |
|---|---|---|---|---|
| s1 | read direct | read via g1 | | |
| s2 | read via g2 | read via g1<br>read via g2 | | |
| s3 | read via g2<br>update via g3 | read via g2 | alter via g3 | alter direct |

Fig. 3

| Subject \ Object | o1 | o2 | o3 | o4 |
|---|---|---|---|---|
| s1 | read | read | | |
| s2 | read | read | | |
| s3 | update | read | alter | alter |

Fig. 4

| Subject \ Subject | s1 | s2 | s3 |
|---|---|---|---|
| s1 | * | 0 | 3 |
| s2 | 0 | * | 3 |
| s3 | 3 | 3 | * |

Fig. 5

| Object \ Object | o1 | o2 | o3 | o4 |
|---|---|---|---|---|
| o1 | * | 1 | 3 | 3 |
| o2 | 1 | * | 3 | 3 |
| o3 | 3 | 3 | * | 0 |
| o4 | 3 | 3 | 0 | * |

Fig. 6

| Subject \ Subject | s1 | s2 | s3 |
|---|---|---|---|
| s1 | * | 0 | 3 |
| s2 | 0 | * | 3 |
| s3 | 3 | 3 | * |

| Object \ Object | o1 | o2 | o3 | o4 |
|---|---|---|---|---|
| o1 | * | 1 | 3 | 3 |
| o2 | 1 | * | 3 | 3 |
| o3 | 3 | 3 | * | 0 |
| o4 | 3 | 3 | 0 | * |

| Environment | ACL entries | ACL direct | aggregations | s->g relations | res. acc | eff. acc |
|---|---|---|---|---|---|---|
| as found | 7 | 2 | 3 | 5 | 10 | 8 |
| subject-subject-corr. | 6 | 0 | 2 | 3 | 8 | 8 |
| object-object-corr. | 4 | 0 | 2 | 4 | 8 | 8 |

METHOD AND SYSTEM FOR ASSIGNING ACCESS RIGHTS IN A COMPUTER SYSTEM

FIELD OF THE INVENTION

The invention relates to the field of role-based access control methods and security systems in distributed and centralized computer systems. More specifically, it relates to a system and a method for assigning access rights to at least one subject on at least one object in a computer system.

BACKGROUND OF THE INVENTION

In the modern landscape of IT systems the challenge of administrating a large number of users with respect to their access rights to different computer systems and resources is a well known problem. Based on conventional concepts, keeping the access rights of users to a large number of different computers and it's resources up to date is more and more considered to be a task which can no longer be achieved. The larger and more complex the security environment, the larger the administrative problems become. This results in large administrative overhead and a more and more insecure security environment due to inconsistent security definitions.

As a solution for this problem role-based concepts have been suggested, such as Sandhu et. al.: The NIST model for role-based access control, Symposium on Access Control Models and Technologies archive, Proceedings of the fifth ACM workshop on Role-based access control table of contents, Berlin, Germany, 2000, or more diversified concepts such as the concept described in U.S. Pat. No. 5,911,143.

Difficulties arise when the above mentioned theoretical concepts are put into practice. When implementing a role-based concept within the IT landscape of an existing enterprise it has to be accepted that a certain security infrastructure already exists. This means that there are generally two choices:

a) designing a new security environment from scratch, where the new environment is based on the new concept, or b) utilizing the existing security environment and transforming it to the new concept.

The first approach means that all information in regard to the requirements for access control is needed, and that a new and "clean" environment is created. To accomplish that a thorough analysis needs to be done as to which kind of access right is really needed for each subject. Even if this might be possible for fairly small systems or new applications, this approach doesn't work in the case of complex and large existing security environments. This is typically the case with large centralized computing environments or a heavily interconnected and interrelated distributed environment, for example an environment with tens of thousands of users having access to thousands of resources. In these cases the workload required to implement the first approach is prohibitive.

The second approach utilizes the existing security environment and implements the new role-based concept on top of that. This is called a role-based administration of the security environment. This works very well if the structure of the existing security environment is appropriate, which means that the existing roles (sometimes also named as groups) are used as an aggregation of existing subjects (more commonly referred to as users). It is the intention of using only this aggregation for access control to computer resources. Experience shows that this is only possible in a few cases where certain areas of computer systems within a larger security environment should be provided with a role-based administration.

OBJECTS AND SUMMARY OF THE INVENTION

It is an object of the present invention to provide a method and a corresponding system for assigning access rights in a computer system which make the administration of this computer system easier and more secure. Furthermore, it is another object of the invention to provide a method and a corresponding system for assigning access rights in a computer system which enable the use of a role-based administration.

It should be emphasised that any reference signs in the claims shall not be construed as limiting the scope of the invention.

According to one aspect of the invention a system is provided for assigning access rights to at least one subject on at least one object in a computer system, wherein the subject is associated with at least one role, the system comprising means for identifying all access rights which have already been granted to the subject, including access rights the subject has because it is a member of an existing role (old role), wherein the role has been granted access rights (indirect access rights), and access rights the subject has irrespective of its membership in the existing role (direct access rights), means for identifying new roles, means for granting access rights to the new roles, means for assigning the at least one subject to at least one new role and means for deleting old roles.

According to another aspect of the invention a method for assigning access rights to at least one subject on at least one object in a computer system is provided, wherein the subject is associated with at least one role. The method comprises the steps of identifying all access rights which have already been granted to the subject, including access rights the subject has because it is member of an existing role, wherein the role has been granted access rights, and access rights the subject has irrespective of its membership in said existing role, identifying new roles, granting access rights to the new roles, assigning the at least one subject to at least one new role, and deleting all old roles.

The solution for the above mentioned technical problems is based on the idea that a more structured set of roles is needed. In many cases the set of access rights in existing computer systems has evolved over the lifetime of the system. This means that many subjects may have unknown access rights and/or have access rights which are not really needed. If an existing computer system already has roles, which should be defined as aggregations of users to which a set of access rights is conferred, the following problems might occur:

Roles have been defined in the past, and their current necessity has not been recently reviewed.

Access rights have been granted to these roles and have not been reviewed.

Subjects may have assumed a new role in the working environment, but their membership to that role in the computer environment is still the same.

Furthermore, subjects may have access rights to resources irrespective of their membership in an existing role. These access rights will be called direct access rights, in contrast to access rights a subject has because it is a member of an existing role. In the latter case the access rights will be called indirect access rights.

Granting direct access rights often happens on an ad hoc basis for certain short-term situations, and is in many cases not mentioned in any documentation. As a result, subjects may have direct access rights which are no longer needed, and the administrator doesn't know that these direct access rights have been granted in the past.

As a result, the set of direct and indirect access rights in an existing computer system is not well-planned, but instead is an unstructured set of access rights which makes the administration burdensome and makes, in many cases, the use of a role-based administration impossible.

According to the invention, the existing set of direct and indirect access rights is replaced by a new set of access rights. The new set of access rights only consists of indirect access rights to make administration easier. New roles are identified which match the current set of access rights as close as possible. The result is a more structured set of access rights and roles which makes the administration of the computer system easier and the system more secure. The more structured set of access rights is in many cases a prerequisite for the use of a role-based administration of the computer landscape.

These and other aspects of the invention will be apparent from and elucidated with reference to the embodiments described thereafter. It should be emphasized that the use of reference signs shall not be construed as limiting the scope of the invention.

BRIEF DESCRIPTION OF THE DRAWINGS

FIG. 3 shows access rights corresponding to FIG. 1 in the form of a matrix, FIG. 4 shows the matrix of FIG. 3 after resolving multiple access rights to a single object, FIG. 5 shows a subject-to-subject correlation matrix, FIG. 6 shows an object-to-object correlation matrix, FIG. 7 illustrates the process of identifying new roles when using the subject-to-subject correlation matrix, FIG. 8 illustrates the process of identifying new roles when using the object-to-object correlation matrix.

DETAILED DESCRIPTION OF THE DRAWINGS AND OF THE PREFERRED EMBODIMENTS

The present invention can be realized in hardware, software, or a combination of hardware and software. Any kind of computer system or other apparatus adapted for carrying out the methods described herein is suitable. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which, when being loaded in a computer system, is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; and b) reproduction in a different material form.

Figure 1:
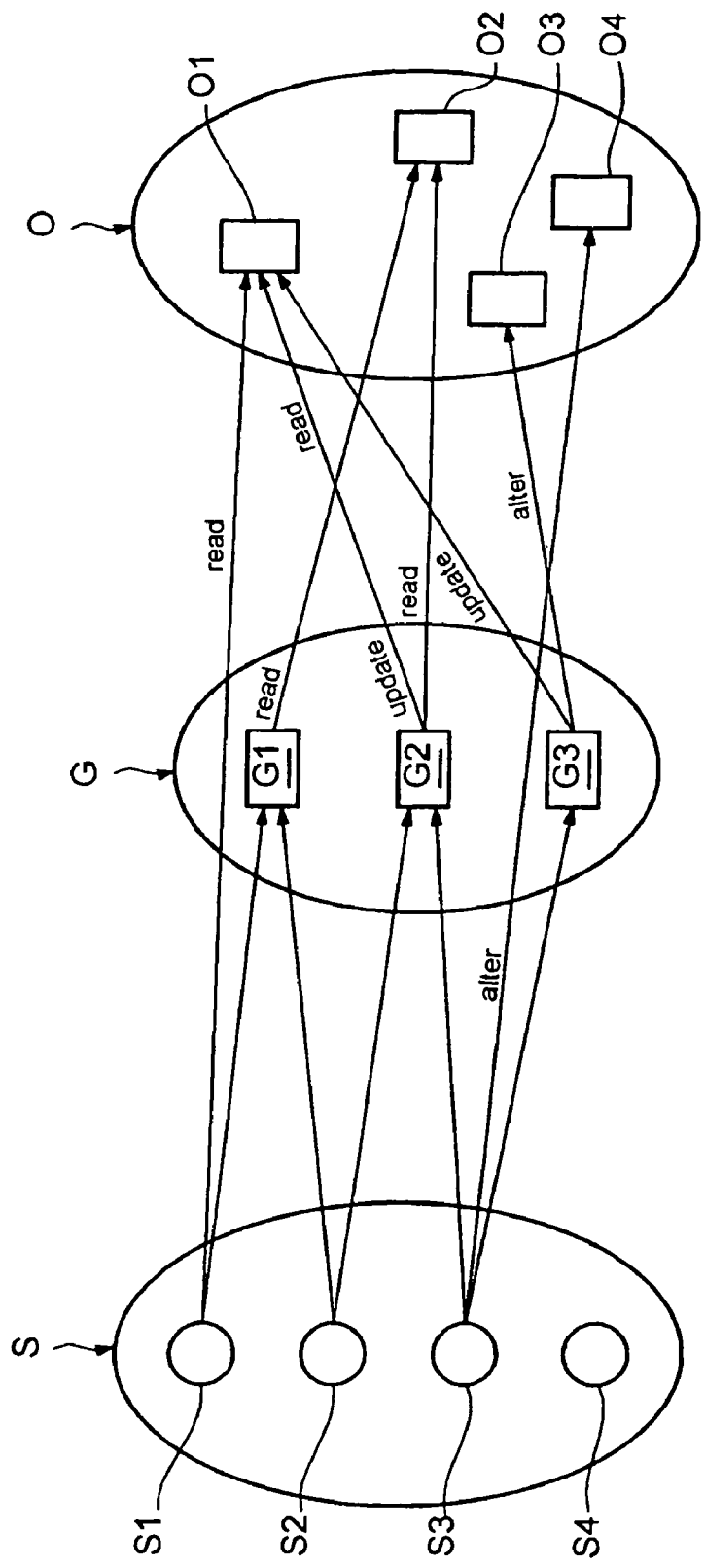
FIG. 1 illustrates access rights which have been granted to a set, S, of subjects and a set, G, of roles on a set, O, of objects in an existing computer system.

FIG. 1 illustrates in a schematic way the set of access rights in an existing computer system prior to using the method or the system according to the present invention. A set S of subjects S1, S2, S3 and S4 have been granted access rights to the set O of objects O1, O2, O3 and O4. The subjects have two types of access rights:

a) subjects S1, S2, S3 have been granted indirect access rights because these are members of existing roles G1, G2, G3, and said roles have been granted access rights. As an example, S1 and S2 are each members of role G1. Members of role G1 have the right to read object O2. As a result, S1 and S2 have a right to read object O2. Similarly, S2 and S3 are members of role G2. All members of G2 have the right to update object O1 and to read object O2. As a consequence, S2 and S3 are entitled to update object O1 and to read object O2. Subject S4 has no indirect access rights, because S4 is not a member of any of roles G1, G2, G3 or G4.

b) access rights subjects S1, S2, S3 and S4 may have irrespective of their membership in an existing role. There is only one such direct access right in FIG. 1, namely the right of subject S3 to alter object O4.

Objects should be understood to be resources within a computer system, which may be software resources, for example, files, or which may be hardware resources. An access right to a software resource may mean the right to read and/or to write. The access right to a hardware resource means that the hardware can be utilized to perform a task, for example, that a printer can be utilized or that an electronically controlled door can be opened.

The access rights described above are read, update and alter. These are the access rights used in an IBM mainframe system RACF (resource access control facility). However, it should be emphasized that the invention may be used with any type of platform, and may even be used in a multi-platform computer system. So other platforms such as UNIX systems, web based applications or SAP may be used.

The identification means serve to identify the current status of an existing computer system with respect to access rights, and thus to identify all access rights indicated by arrows in FIG. 1. The identification means identify all direct access rights and all indirect access rights of all subjects of the predefined set S of subjects with regard to all objects O on the computer system.

Identification means not only identifies that a certain subject has an access right to a certain object, but may also determine the type of access right in that case. The kind of access right depends on the platform used for example, a UNIX, a web based application, or a MVS mainframe.

The set S of subjects S1, S2, S3 and S4 may be all users of the system, and thus may include tens of thousands of users or more. However, this set S of subjects may also be a portion of all subjects working on the system. As an example, set S may be all subjects of a department or of a working group.

Figure 2:
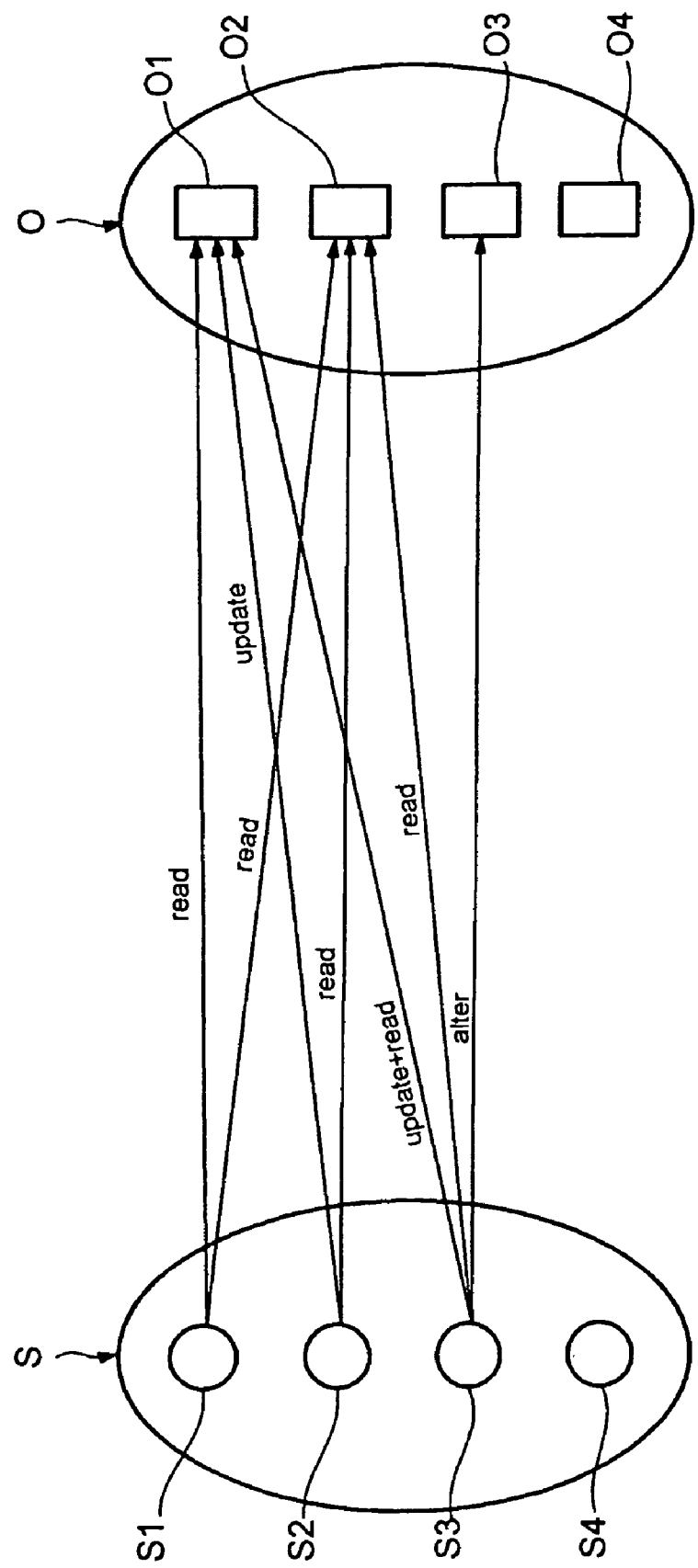
FIG. 2 shows access rights corresponding to FIG. 1 after the identification of all access rights.

The step of identifying existing access rights serves to resolve the existing roles in order to establish a direct relationship between the subjects and the objects with respect to the access rights. The result is shown in FIG. 2. In FIG. 2, indirect access rights, shown in FIG. 1, have been substituted by direct access rights of the same type. For example, the right of all members of G3 to update object O1 and to alter object O3 has been replaced by a direct read and update permission of S3 with respect to O1, and by a direct permission of S3 to alter O3.

As can be seen from FIG. 2, subjects may have multiple access rights with respect to certain objects. In this respect S3 has the right to update O1, and has the right to read O1.

FIG. 3 shows the access rights corresponding to FIG. 1 in the form of a matrix. The rows of the matrix are assigned to subjects, and the columns of the matrix are assigned to objects, such that an entry Sx-Oy denotes the access right(s) of subject Sx on object Oy. Empty entries such as the entry S1-O3 mean that the subject has no access right to the corresponding object. As an example, the entry S3-O1 shows that S3 is allowed to read O1, and
that the permission to read is an indirect access right because S3 is a member of G2
that S3 is allowed to update O1
that the permission to update O1 is an indirect access right, because S3 is a member of G3

Similar considerations apply to all other entries of the matrix.

FIG. 4 shows the matrix of FIG. 3 after resolving the existing roles and after resolving multiple access rights to a single object. So the matrix shown in FIG. 4 doesn't differentiate whether the access right is a direct access right or an indirect access right. Furthermore the multiple access rights shown in entry S3-O1 are replaced by a single access right of the type "update".

In the case of multiple access rights the type of access right which is higher in ranking can be chosen as the only access right in the matrix of FIG. 4. In general this depends on the platform and is decided within the platform context.

The matrix shown in FIG. 4 serves as a starting point to identify new roles by means of a correlation analysis. Two possibilities to carry out the analysis are described hereinbelow.

The first possibility is to carry out a correlation over subjects, which means that the correlation algorithm searches for subjects which have the same or similar types of access rights to a set of objects. Referring to the matrix of FIG. 4 it can be seen that S1 and S2 have identical access rights with respect to all objects O1-O4: the right to read O1 and O2, and no access right with respect to O3 and O4. On the other hand S2 and S3 have different access rights with respect to O1, O3 and O4, and the same access right with respect to O2.

More systematically, the following may be done:
a) identify pairs of subjects chosen arbitrarily from the overall number of subjects, and
b) compare the types of access rights the two subjects of each pair have with respect to all objects of a set of objects.

The first a) step is preferably done for all possible pairs of subjects. If there are n subjects, n being an integer, there are n!/(2!*(n−2)!) distinct pairs of subjects which can be identified. In the case of FIG. 4, there are 3 distinct pairs, namely the pairs (S1, S2), (S1,S3) and (S2,S3).

In the second step b), the types of access rights of the two members of each pair are compared with each other. Concerning a pair of subjects, a comparison is made between which types of access rights the first member and the second member have with respect to the same object. This comparison is made for all objects or a set of objects.

The result of these comparisons can be translated into numbers: for each pair of subjects the number of different types of access rights to all objects of a set of objects can be outputted. As an example, for the pair (S1,S2) this number is 0, as S1 and S2 have identical access rights with respect to all objects O1 to O4, see above. On the other hand, concerning the pair (S2,S3) this number is 3, as S2 and S3 have three different types of access rights with respect to all objects, namely with respect to O1, O3 and O4. Similarly, the number for the pair (S1,S3) is 3.

The results of all these comparisons may be placed into a subject-to-subject correlation matrix as shown in FIG. 5. In this correlation matrix the rows and the columns denote subjects. The entries denote the number of different types of access rights a subject found in a row and a subject found in a column include. The matrix is symmetric. The entries of the diagonal have an asterisk as these entries make no sense. All numbers described in the last paragraph are found twice in the matrix: above and below the diagonal defined by the entries (S1,S1), (S2,S2) and (S3,S3).

The matrix of FIG. 5 serves to find new roles which are illustrated by FIG. 7. The entries (S1,S2) and (S2,S1) are both 0, which indicates that both subjects S1 and S2 do not have different types of access rights with respect to all objects O1 to O4. Thus a new role NR1 can be defined, and the two subjects S1 and S2 will be members of new role NRI. From FIG. 4 it can be seen that all members of the new role will be granted a read permission to O1 and O2. S3 is assigned to a second role NR2, whereby S3 is the only member of NR2. All members of NR2 have the right to update O1, to read O2 and to alter O3 and O4.

As can be seen, new roles are identified, wherein the choice of the new roles depends on the similarities the subjects have with respect to their types of access rights. The numbers in the above described subject-to-subject correlation matrix can include a threshold value, for example, 1 can be chosen for these numbers: if two or more subjects have differences in their types of access rights which is less than or equal to the threshold value, then these subjects may be considered to form a new role. However, in the case of a threshold value being larger than zero the administrator has to decide on an individual basis if the change of access right(s) of the corresponding subject is acceptable.

The second possibility is to carry out a correlation over objects, which means that the algorithm searches for objects to which a set of subjects have the same or similar type of access rights.

This is done in a highly symmetric way in comparison to a correlation over subjects. Again, the matrix of FIG. 4 serves as a starting point, and an algorithm:
a) identifies pairs of objects chosen arbitrarily from the overall number of objects, and
b) compares the types of access rights of all subjects of a set of subjects to each of the two objects.

The first a) step is preferably done for all possible pairs of objects, such that n!/(2!*(n−2) !) distinct pairs of objects can be identified when there are n objects. Referring to FIG. 4, there are 6 distinct pairs, namely the pairs (O1,O2), (O1,O3), (O1,O4), (O2,O3), (O2,O4) and (O3,O4).

In the second step b), the types of access rights of all subjects to the two members of each pair of objects are compared with each other. Concerning a pair of objects, a comparison is made with which types of access rights a subject has to the first member and to the second member. This comparison is made for all subjects or a set of subjects.

As in the case of the correlation over subjects, the result of these comparisons can be translated into numbers: for each pair of objects the number of different types of access rights of all subjects of a set of subjects can be outputted.

The matrix corresponding to FIG. 5 is shown in FIG. 6, as an object-to-object correlation matrix. Each entry Ox-Oy in the object-to-object correlation matrix is a number, the number of different types of access rights all subjects (or a set of subjects) have with respect to Ox and Oy. For example, the entry (O1,O2) is 1, which means that all subjects but one have the same type of access right with respect to O1 and O2. This can be verified by FIG. 4: S1 and S2 have the same type of access right (a read permission) both to O1 and to O2, whereas S3 has different types of access rights with respect to O1 and O2.

FIG. 8 illustrates how new roles can be identified: O3 and O4 have no differences in their access rights as the entries (O3,O4) and (O4,O3) are zero. Thus another new role NR1 can be defined, wherein members of the new role are given the same type of access to O3 and O4. As can be derived with the help of FIG. 4, the only member of this new role will be S3.

Furthermore, a second new role NR2 can be identified. NR2 is given access to O1 and O2, and S1 and S2 are members of NR2. S3 can also be made a member of NR2 if an access change is possible. Looking on FIG. 4 it has to be decided whether it would be acceptable if S3 can have a read permission instead of an update permission with respect to O1. This has to be decided on an individual basis by the administrator of the computer system. If the answer is yes, then S3 will become a member of NR2, and all members of NR2 will only have the right to read O1 and O2.

Figure 9:
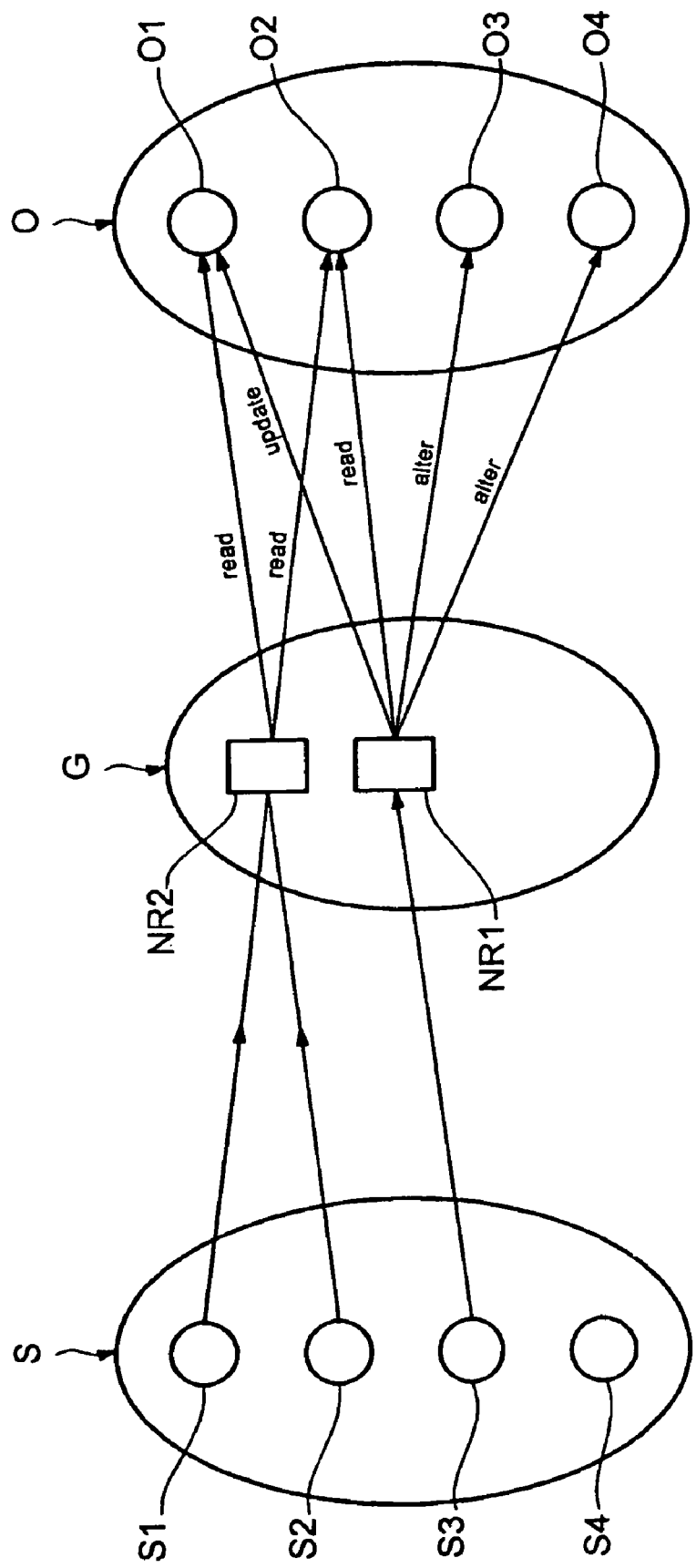
FIG. 9 illustrates access rights which have been granted to a set, S, of subjects and a set, G, of roles on a set, O, of objects after carrying out the method according to the invention.

The result of the steps taken above is shown in FIG. 9, whereby the result doesn't depend on whether a correlation over subjects or a correlation over objects is made. As can be seen, the system of access rights is much clearer and more structured than the original system shown in FIG. 1.

In the description above the method for determining new roles has been explained. When new roles have been found/identified, the following is done:
the new roles are granted access rights as defined above,
at least one subject is assigned to at least one new role,
all old roles and all old direct access rights are deleted.

As mentioned above there are two possibilities for finding new roles: identifying new roles can be done by performing a subject-to-subject correlation, or by performing an object-to-object correlation. It has been found that both results improve the structure of all of access rights, but that both approaches yield different results depending on the individual situation of the computer system. It is thus helpful to apply both approaches, to compare results, and then to choose one of the solutions which is more appropriate in the case.

The identification of new roles is done by some kind of algorithm. This means, that the identification of new roles, and the steps mentioned in the last paragraph, can (at least partially) be carried out by a piece of software which is directly loadable in the internal memory of a digital computer, and which is executable by said digital computer. As usual, the software can be stored on a storage medium such as a hard disk, a CD or a DVD, or transmitted by means of an electric carrier signal over a computer network.

Figures 10, 11:
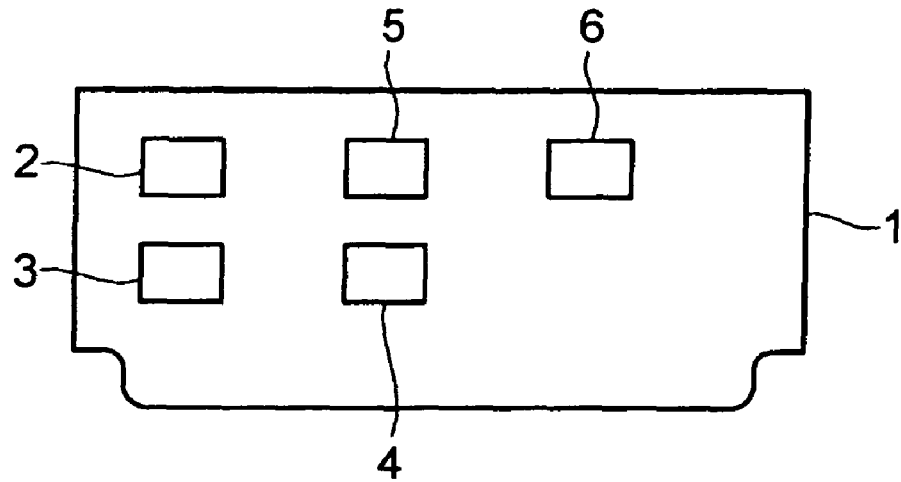
FIG. 10 illustrates the system for carrying out the invention.
FIG. 11 shows statistical results of the computer system before and after carrying out the method of the invention.

The software can run on a computer, but can also be implemented as a firmware for a programmable memory unit such as an EPROM, an ASIC or the like. This is why the invention can be carried out by a corresponding system embodied in hardware as shown in FIG. 10. The system may have the form of a PCI card 1 which is put into the slot of a computer mainboard (not shown). The PCI card 1 has means 2 for identifying access rights which have already been granted to subjects. It further includes means 3 to identify new roles, means 4 to grant access rights to the new roles, means 5 to assign subjects to the new roles, and means 6 to delete the old roles. All means can be of the same type, and may be ASICs, EPROMs, FPGA's, embedded microcontrollers or microprocessors. In most cases it will be sufficient to have just one hardware component of the above mention's type.

One of the practical advantages of the invention can be seen with the help of FIG. 11. The columns of the FIG. 11 matrix denote statistical values of a computer system. The rows denote the computer system before carrying out the method according to the invention (row 1), after carrying out the invention by usage of a subject-to-subject correlation (row 2), and after carrying out the invention by usage of an object-to-object correlation (row 3). The first column denotes the total number of ACL (access control list) entries which is equal to the sum of all direct and indirect access rights. "ACL direct" denotes the sum of all direct access rights, "aggregations" the number of roles, "s→g relations" the number of subject-to-role relations", "res acc." the number of resources accesses, and "eff. acc" the number of effective accesses. The difference between resource accesses and effective accesses represents cases with a multiple access to an object. As can be seen, the ACL list is shorter after carrying out the invention. This means that the performance of the system is improved. Depending on the number of roles which already exist before the method according to the invention is carried out, the ACL list can be made shorter by between about 10% and about 90%.

LIST OF REFERENCE NUMERALS

S set of subjects
S1 subject S1
S2 subject S2
S3 subject S3
S4 subject S4
O set of objects
O1 object O1
O2 object O2
O3 object O3
O4 object O4
G set of roles
G1 role G1
G2 role G2
G3 role G3
NR1 new role 1
NR2 new role 2
01 PCI card
02 means for identifying existing access rights and existing roles
03 means for identifying new roles
04 means for granting access rights to the new roles
05 means for assigning subjects to new roles
06 means for deleting old roles What has been shown and described are at present considered the preferred embodiments of this invention, it will be obvious to those skilled in the art that various changes and modifications can be made therein without departing from the scope of the invention as defined by the appended claims.

What is claimed is:

1. A method for assigning to at least two subjects access rights to at least two objects in a computer system, said method comprising:
identifying all access rights which have been granted to said each subject, wherein said all access rights have a respective level selected from ordered levels consisting of a read level, an update level, and an alter level, the read level being a lowest level of said all access rights, the alter level being a highest level of said all access rights, said all access rights including:
- an indirect access right that said each subject has on an object of said at least two objects by use of a respective existing role of at least one existing role, wherein said each subject is a member of the respective existing role, and wherein the respective existing role has an access right to said object, and
- a direct access right that said each subject has on another object of said at least two objects irrespective of said each subject's membership in said at least one existing role,
- wherein said each subject represents a respective user that manipulates a group of objects to which said each subject has said identified access rights within the computer system, and wherein the group of objects represents at least one data object corresponding to a respective resource of the computer system;

after said identifying said all access rights, identifying, by a computer, at least one new role, said identifying said at least one new role comprising:
- analyzing a correlation selected from the group consisting of a subject-to-subject correlation and an object-to-object correlation, wherein the subject-to-subject correlation is defined as a first correlation comparing a first group of access rights granted to a first subject with a second group of access rights granted to a second subject, and wherein the object-to-object correlation is defined as a second correlation comparing a third group of access rights manipulating a first object with a fourth group of access rights manipulating a second object; and
- creating said at least one new role in accordance with a result from said analyzing;

granting each role of said at least one new role access rights to each object of said at least two objects;

assigning said each subject to a role of said at least one new role; and deleting said at least one existing role.

2. The method according to claim 1, said identifying said all access rights comprising resolving said all access rights of said each subject on each object of said at least two objects, said resolving comprising:
- integrating a first indirect access right of a first subject of said at least two subjects on a first object of said at least two objects into a first direct access right of the first subject on the first object; and
- absorbing a first access right in a first level of a second subject of said at least two subjects on a second object of said at least two objects into a second access right in a second level of the second subject on the second object, and wherein the first level is lower than the second level.

3. The method according to claim 1, wherein the correlation is the subject-to-subject correlation in said analyzing, wherein said identifying said at least one new role is performed by searching for at least two subjects of said at least two subjects having the same or similar access rights to a subset of said at least two objects.

4. The method according to claim 1, wherein the correlation is the subject-to-subject correlation, said analyzing comprising:
- identifying a pair of subjects chosen from said at least two subjects;
- comparing the types of access rights that said pair of subjects have with respect to all objects of said at least two objects; and
- determining that subjects in said pair have a first identical set of access rights with respect to said all objects.

5. The method according to claim 1, wherein the correlation is the subject-to-subject correlation, said analyzing comprising:
- identifying a pair of subjects chosen from said at least two subjects;
- comparing the types of access rights that said pair of subjects have with respect to all objects of said at least two objects;
- determining that subjects in said pair have at least one different access right with respect to said all objects;
- outputting the number of different access rights to said all objects for said pair of subjects, wherein said number of different access rights is greater than a first predefined threshold of different access rights within said pair of subjects to be members to a first role of said at least one new role; and
- receiving an input that permits creation of a first new role of said at least one new role for said each pair of subjects, wherein the first new role comprises a first set of access rights with respect to said all objects.

6. The method according to claim 1, wherein the correlation is the object-to-object correlation in said analyzing, wherein each role of said at least one new role is identified by searching for a subset of said at least two objects to which a subset of said at least two subjects have the same or similar access rights.

7. The method according to claim 1, wherein the correlation is the object-to-object correlation, said analyzing comprising:
- identifying a pair of objects chosen from said at least two objects;
- comparing the access rights of all subjects of said at least two subjects to objects in the pair of objects; and
- determining that said all subjects have a second identical set of access rights with respect to said objects in the pair of objects.

8. The method according to claim 1, wherein the correlation is the object-to-object correlation, said analyzing comprising:
- identifying a pair of objects chosen from said at least two objects;
- comparing the access rights of all subjects of said at least two subjects to objects in the pair of objects;
- determining that said all subjects have at least one different access right with respect to the objects in the pair of objects;
- outputting the number of different access rights of said all subjects for said pair of objects, wherein said number of different access rights is greater than a second predefined threshold of different access rights among the objects of said pair of objects that are accessed by a second role of said at least one new role; and
- receiving an input that permits creation of a second new role of said at least one new role for said pair of objects by lowering levels of said different access rights to the objects of said pair of object such that the second new role comprises a second set of access rights on the objects of said pair of objects for all member subjects of the second new role.

9. A computer program product comprising:
a computer-readable storage medium having a computer-readable program code stored therein, said computer-readable program code containing instructions that when executed by a processor of a computer system implement assigning to at least two subjects access rights to at least two objects in a computer system, said assigning comprising:

identifying all access rights which have been granted to said each subject, wherein said all access rights have a respective level selected from ordered levels consisting of a read level, an update level, and an alter level, the read level being a lowest level of said all access rights, the alter level being a highest level of said all access rights, said all access rights including:

an indirect access right that said each subject has on an object of said at least two objects by use of a respective existing role of at least one existing role, wherein said each subject is a member of the respective existing role, and wherein the respective existing role has an access right to said object, and a direct access right that said each subject has on another object of said at least two objects irrespective of said each subject's membership in said at least one existing role, wherein said each subject represents a respective user that manipulates a group of objects to which said each subject has said identified access rights within the computer system, and wherein the group of objects represents at least one data object corresponding to a respective resource of the computer system;

after said identifying said all access rights, identifying, by a computer, at least one new role, said identifying said at least one new role comprising:

analyzing a correlation selected from the group consisting of a subject-to-subject correlation and an object-to-object correlation, wherein the subject-to-subject correlation is defined as a first correlation comparing a first group of access rights granted to a first subject with a second group of access rights granted to a second subject, and wherein the object-to-object correlation is defined as a second correlation comparing a third group of access rights manipulating a first object with a fourth group of access rights manipulating a second object; and creating said at least one new role in accordance with a result from said analyzing;

granting each role of said at least one new role access rights to each object of said at least two objects;

assigning said each subject to a role of said at least one new role; and deleting said at least one existing role.

10. The computer program product according to claim 9, said identifying said all access rights comprising resolving said all access rights of said each subject on each object of said at least two objects, said resolving comprising:

integrating a first indirect access right of a first subject of said at least two subjects on a first object of said at least two objects into a first direct access right of the first subject on the first object; and absorbing a first access right in a first level of a second subject of said at least two subjects on a second object of said at least two objects into a second access right in a second level of the second subject on the second object, and wherein the first level is lower than the second level.

11. The computer program product according to claim 9, wherein the correlation is the subject-to-subject correlation in said analyzing, wherein said identifying said at least one new role is performed by searching for at least two subjects of said at least two subjects having the same or similar access rights to a subset of said at least two objects.

12. The computer program product according to claim 9, wherein the correlation is the subject-to-subject correlation, said analyzing comprising:

identifying a pair of subjects chosen from said at least two subjects;

comparing the types of access rights that said pair of subjects have with respect to all objects of said at least two objects; and determining that subjects in said pair have a first identical set of access rights with respect to said all objects.

13. The computer program product according to claim 9, wherein the correlation is the subject-to-subject correlation, said analyzing comprising:

identifying a pair of subjects chosen from said at least two subjects;

comparing the types of access rights that said pair of subjects have with respect to all objects of said at least two objects;

determining that subjects in said pair have at least one different access right with respect to said all objects;

outputting the number of different access rights to said all objects for said pair of subjects, wherein said number of different access rights is greater than a first predefined threshold of different access rights within said pair of subjects to be members to a first role of said at least one new role; and receiving an input that permits creation of a first new role of said at least one new role for said each pair of subjects, wherein the first new role comprises a first set of access rights with respect to said all objects.

14. The computer program product according to claim 9, wherein the correlation is the object-to-object correlation in said analyzing, wherein each role of said at least one new role is identified by searching for a subset of said at least two objects to which a subset of said at least two subjects have the same or similar access rights.

15. The computer program product according to claim 9, wherein the correlation is the object-to-object correlation, said analyzing comprising:

identifying a pair of objects chosen from said at least two objects;

comparing the access rights of all subjects of said at least two subjects to objects in the pair of objects; and determining that said all subjects have a second identical set of access rights with respect to said objects in the pair of objects.

16. The computer program product according to claim 9, wherein the correlation is the object-to-object correlation, said analyzing comprising:

identifying a pair of objects chosen from said at least two objects;

comparing the access rights of all subjects of said at least two subjects to objects in the pair of objects;

determining that said all subjects have at least one different access right with respect to the objects in the pair of objects;

outputting the number of different access rights of said all subjects for said pair of objects, wherein said number of different access rights is greater than a second predefined threshold of different access rights among the objects of said pair of objects that are accessed by a second role of said at least one new role; and receiving an input that permits creation of a second new role of said at least one new role for said pair of objects by lowering levels of said different access rights to the objects of said pair of object such that the second new role comprises a second set of access rights on the objects of said pair of objects for all member subjects of the second new role.

17. A computing system comprising:

a processor coupled to a computer-readable memory unit, said memory unit comprising a software application, said software application comprising instructions that when executed by said processor, implement assigning to at least two subjects access rights to at least two objects in a computer system, said assigning comprising:

identifying all access rights which have been granted to said each subject, wherein said all access rights have a respective level selected from ordered levels consisting of a read level, an update level, and an alter level, the read level being a lowest level of said all access rights, the alter level being a highest level of said all access rights, said all access rights including:

an indirect access right that said each subject has on an object of said at least two objects by use of a respective existing role of at least one existing role, wherein said each subject is a member of the respective existing role, and wherein the respective existing role has an access right to said object, and a direct access right that said each subject has on another object of said at least two objects irrespective of said each subject's membership in said at least one existing role, wherein said each subject represents a respective user that manipulates a group of objects to which said each subject has said identified access rights within the computer system, and wherein the group of objects represents at least one data object corresponding to a respective resource of the computer system;

after said identifying said all access rights, identifying, by a computer, at least one new role, said identifying said at least one new role comprising:

analyzing a correlation selected from the group consisting of a subject-to-subject correlation and an object-to-object correlation, wherein the subject-to-subject correlation is defined as a first correlation comparing a first group of access rights granted to a first subject with a second group of access rights granted to a second subject, and wherein the object-to-object correlation is defined as a second correlation comparing a third group of access rights manipulating a first object with a fourth group of access rights manipulating a second object; and creating said at least one new role in accordance with a result from said analyzing;

granting each role of said at least one new role access rights to each object of said at least two objects;

assigning said each subject to a role of said at least one new role; and deleting said at least one existing role.

18. The computing system according to claim 17, said identifying said all access rights comprising resolving said all access rights of said each subject on each object of said at least two objects, said resolving comprising:

integrating a first indirect access right of a first subject of said at least two subjects on a first object of said at least two objects into a first direct access right of the first subject on the first object; and absorbing a first access right in a first level of a second subject of said at least two subjects on a second object of said at least two objects into a second access right in a second level of the second subject on the second object, and wherein the first level is lower than the second level.

19. The computing system according to claim 17, wherein the correlation is the subject-to-subject correlation in said analyzing, wherein said identifying said at least one new role is performed by searching for at least two subjects of said at least two subjects having the same or similar access rights to a subset of said at least two objects.

20. The computing system according to claim 17, wherein the correlation is the subject-to-subject correlation, said analyzing comprising:

identifying a pair of subjects chosen from said at least two subjects;

comparing the types of access rights that said pair of subjects have with respect to all objects of said at least two objects; and determining that subjects in said pair have a first identical set of access rights with respect to said all objects.

21. The computing system according to claim 17, wherein the correlation is the subject-to-subject correlation, said analyzing comprising:

identifying a pair of subjects chosen from said at least two subjects;

comparing the types of access rights that said pair of subjects have with respect to all objects of said at least two objects;

determining that subjects in said pair have at least one different access right with respect to said all objects;

outputting the number of different access rights to said all objects for said pair of subjects, wherein said number of different access rights is greater than a first predefined threshold of different access rights within said pair of subjects to be members to a first role of said at least one new role; and receiving an input that permits creation of a first new role of said at least one new role for said each pair of subjects, wherein the first new role comprises a first set of access rights with respect to said all objects.

22. The computing system according to claim 17, wherein the correlation is the object-to-object correlation in said analyzing, wherein each role of said at least one new role is identified by searching for a subset of said at least two objects to which a subset of said at least two subjects have the same or similar access rights.

23. The computing system according to claim 17, wherein the correlation is the object-to-object correlation, said analyzing comprising:

identifying a pair of objects chosen from said at least two objects;

comparing the access rights of all subjects of said at least two subjects to objects in the pair of objects; and determining that said all subjects have a second identical set of access rights with respect to said objects in the pair of objects.

* * * * *